US008339635B2

(12) United States Patent
Patwardhan et al.

(10) Patent No.: US 8,339,635 B2
(45) Date of Patent: Dec. 25, 2012

(54) PRINTER REDIRECTION

(75) Inventors: Makarand Patwardhan, Redmond, WA (US); Vladimir Stoyanov, Redmond, WA (US); Gaurav Daga, Redmond, WA (US); Mahadeva Alladi, Redmond, WA (US); Nelly Porter, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1172 days.

(21) Appl. No.: 11/695,717

(22) Filed: Apr. 3, 2007

(65) Prior Publication Data

US 2008/0246985 A1 Oct. 9, 2008

(51) Int. Cl.
*G06F 3/12* (2006.01)

(52) U.S. Cl. ............ 358/1.15; 358/1.9; 358/1.13

(58) Field of Classification Search ........... 358/1.1–1.18
See application file for complete search history.

(56) References Cited

U.S. PATENT DOCUMENTS

| 5,881,213 | A | 3/1999 | Shaw et al. |
|---|---|---|---|
| 6,757,070 | B1 | 6/2004 | Lin et al. |
| 7,064,856 | B2 | 6/2006 | Fu et al. |
| 7,583,410 | B1 * | 9/2009 | Anup et al. ............ 358/2.1 |
| 2002/0075496 | A1 | 6/2002 | Zhang et al. |
| 2002/0169002 | A1 | 11/2002 | Imbrie et al. |
| 2003/0090697 | A1 | 5/2003 | Lester et al. |
| 2004/0130746 | A1 | 7/2004 | Wu |
| 2004/0136023 | A1 | 7/2004 | Sato |
| 2004/0190042 | A1 | 9/2004 | Ferlitsch et al. |
| 2005/0174599 | A1 * | 8/2005 | Ferlitsch ............ 358/1.15 |
| 2005/0185211 | A1 * | 8/2005 | Foehr et al. ............ 358/1.15 |
| 2007/0136660 | A1 * | 6/2007 | Gurcan et al. ............ 715/513 |
| 2009/0091791 | A1 * | 4/2009 | Ferlitsch ............ 358/1.15 |

OTHER PUBLICATIONS

"MetaFrame XPs, English Version 1.0", retrieved at <<http://www.sessioncomputing.com/PDF/OverviewXPs.pdf>>, Feb. 1, 2001, pp. 1-20.

Pultar, "Design and Implementation of a Failsafe Print System", retrieved at <<http://www.usenix.org/event/lisa99/full_papers/pultar/pultar.pdf>>, Proceedings of LISA'99: 13th Systems Administration Conference, Nov. 7-12, 1999, The USENIX Association, 1999, pp. 218-228.

Wright, "Design Goals for an Internet Printing Protocol", retrieved at <<http://www.faqs.org/ftp/rfc/pdf/rfc2567.txt.pdf>>, The Internet Society, Apr. 1999, pp. 1-43.

* cited by examiner

*Primary Examiner* — Benny Q Tieu
*Assistant Examiner* — Marcellus Augustin
(74) *Attorney, Agent, or Firm* — Lee & Hayes, PLLC (57) ABSTRACT

In client-server architectures, systems and methods for XPS based printer redirection are disclosed. In an implementation, a client computing device issues a print command to print an application hosted on a server computing device. The server computing device implements a generic printer driver to emulate exact properties of a client printer driver installed in the client computing device. The generic printer driver redirects one or more calls related to printer settings to the client printer driver. The client computing device returns the printer settings which are combined with the application (to be printed) to generate an XPS file. The XPS file is redirected to a printer connected to the client computing device for printing.

18 Claims, 6 Drawing Sheets

PRINTER REDIRECTION

BACKGROUND

In server-client computer architectures/systems, a server computing device (server) may be called upon to handle communication interaction with a variety of client-based applications. A client computing device (client) locates the server and requests a connection with the server and the server allocates resources to handle requests from the client. Such requests may include an access request to an application hosted on the server, a print request to a designated printing device (printer) connected to the client, etc.

For example, a server operating system may enable the client to work with applications hosted by the server and create and print data associated with the applications. Typical methods accomplish this by installing relevant printer drivers on the server, where each printer driver corresponding to a printer connected to the client. Accordingly, for each printer and operating system, a printer driver is installed on the server to enable the server to process print jobs to the printer. The installation of printer drivers on the server may be cumbersome due to numerous printers that are available in the market. Furthermore, where the client and the server are based on different operating systems, printer drivers installed on the client or the server may not be compatible with a print command issued by the client to print an application hosted on the server.

SUMMARY

This summary is provided to introduce simplified concepts of printer redirection, which is further described below in the Detailed Description. This summary is not intended to identify essential features of the claimed subject matter, nor is it intended for use in determining the scope of the claimed subject matter.

In an embodiment, a printer settings associated with an application resident at server are queried. The query is redirected to a printer driver at a client performing the requests. The printer settings associated with a printer connected to the client are then provided back to the server, where the printer settings may be converted to a document used for printer.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

In a typical client-server computing environment, a server computing device (server) installs printer drivers for all printing devices (printers) which may be connected to remote client computing devices (clients). Also traditional or legacy printer drivers are generally dependent on an operating system under which a computer is operating. For example, a situation may occur wherein, for example, the server is running on a particular operating system while the local remote client computer (client) is running on a different operating system, and the printer connected to the client has printer drivers that are specific to the operating system of the client. In this situation, even if the same printer drivers are installed on the server, the server may not recognize or support the printer drivers installed on the client. In such a case, it may be difficult to print applications hosted on the server to the remote printer connected to the client. Also a large number of printer drivers may have to be installed on the server to support various printers that may be connected to the client.

It may be desirable to implement a generic printer driver at the server to support such printers. To this end, the disclosed systems and methods enable the client to print data associated with one or more applications hosted on the server independent of the printer connected to the client. In an exemplary implementation, a generic printer driver may be installed in the server, where the generic printer driver emulates the properties of a printer driver associated with the client—the client providing a print command. Queries to the generic printer driver, related to printing preferences and document properties (printer settings), are directed to the printer driver associated with the client initiating the printing process. The printer driver at the client answers the queries and sends the printer settings to the server. The generic printer driver can convert the printer settings and the application (to be printed) to an XML (extensible mark up language) Paper Specification (i.e., XPS) format file (i.e., XPS document). The XPS document is forwarded to the client, which directs the local printer to print the application based on the printer settings.

The following disclosure describes systems and methods for printer redirection. While aspects of described systems and methods for XPS based printer redirection can be implemented in any number of different computing systems, environments, and/or configurations, embodiments of the systems and methods are described in the context of the following exemplary system architecture(s).

Exemplary System

Figure 1:
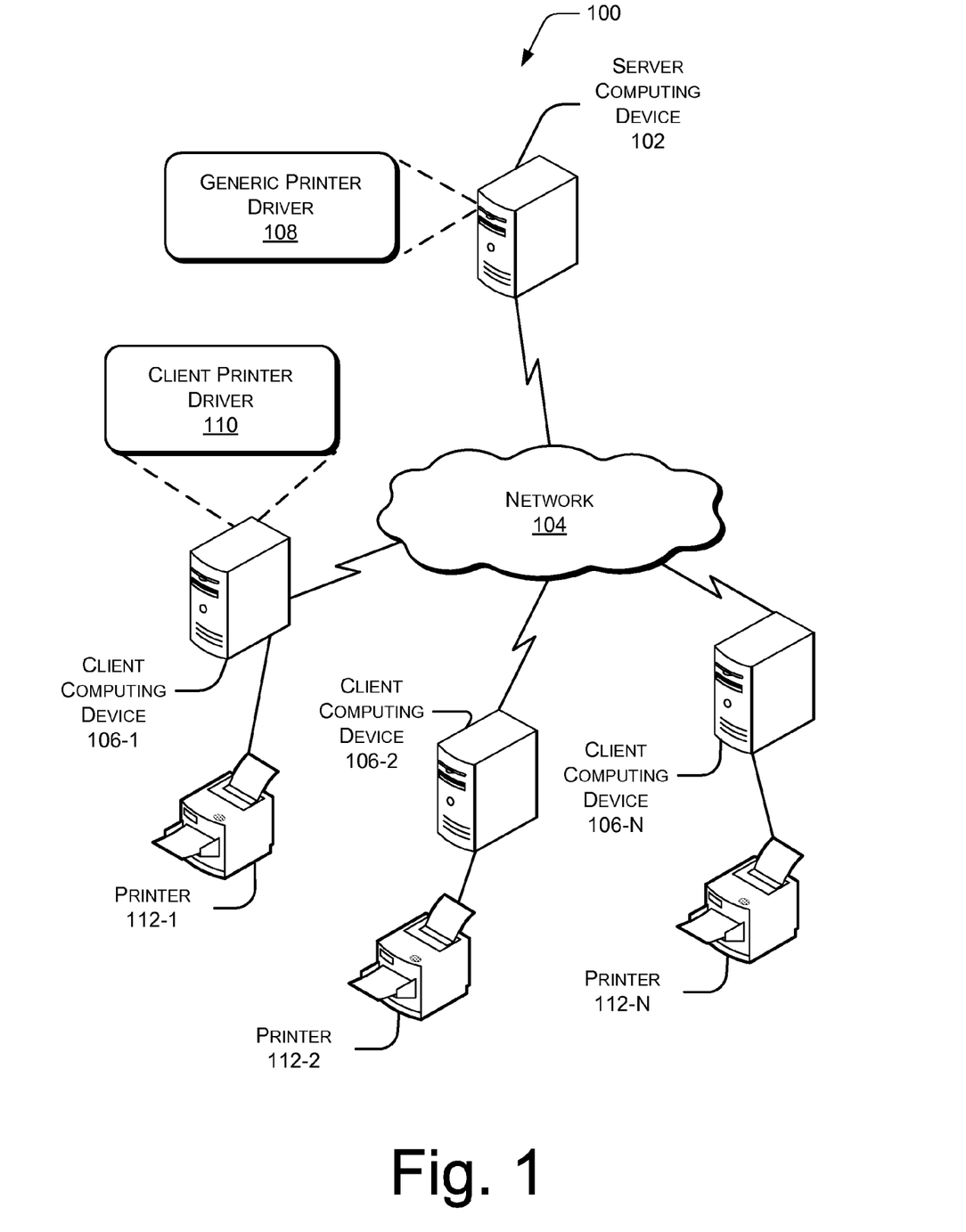
FIG. 1 is an illustration of an exemplary remote client access system implementing printer redirection in a client-server computing environment.

FIG. 1 shows an exemplary remote client access system 100 implementing XPS based printer redirection in a client-server computing environment. To this end, the system 100 includes a server computing device or server 102 communicating through a network 104 with one or more client computing devices or clients 106-1, 106-2, . . . , 106-N. The system 100 may be a Terminal Service™ system as provided or defined by the Microsoft Corporation, where the multiple clients 106 rely on applications which execute on the server 102.

The server computing device 102 may be implemented with an operating system such as Windows® Server 2003 operating system provided by the Microsoft Corporation. The server 102 and the clients 106 may implement a communication protocol such as remote data protocol (RDP), in order to pass data or information (i.e., communicate) with one another. The use of such communication protocols, and particularly RDP, may be implemented in the context of a remote client access system such as a Terminal Services™ system.

The server 102 may be implemented as any of a variety of conventional computing devices, including, for example, a desktop PC, a notebook or portable computer, a workstation, a mainframe computer, a mobile computing device, an Internet appliance, etc. that may be configured to function as an application server. The server 102 may also include one or more of the aforementioned conventional computing devices configured as a server in a server-client computing environment.

The clients 106 may be a general-purpose PC (personal computer), a laptop PC, a tablet PC, or the like, and may implement an operating system such as a Windows® brand operating system from the Microsoft Corporation. The clients 106 may be a standalone computer that primarily interfaces to server 102 to access files or other information (e.g., application programs resident at the server computing device 102) that are not locally stored at client computing device 106.

The network 104 may be a wireless or a wired network, or a combination thereof. The network 104 may also be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof. Moreover, the network 104 connecting the server 102 and clients 106 may implement a transport protocol such as transmission control protocol over Internet protocol (TCP/IP).

The server 102 may host one or more applications which may be accessed or executed by the clients 106. Such applications may include, for example, word processors, data sheet applications, web browsers, and other similar applications which provide for a print facility. Execution of the applications implies one or more client-server sessions between the server 102 and the clients 106. The clients 106 may select an application and provide a print command for printing data associated with the application (application data) on to local printers 112 connected to the clients 106. The print command is intercepted by the application and a generic printer driver 108 installed in the server 102 is invoked. The generic printer driver 108 handles the configuration and rendering aspects associated with the print command.

It is to be noted that printers may have their own "language." For example, while a print command is being processed, the application data is transformed to a format that a printer can recognize, interpret, and print out. In computers, a printer driver includes software that converts the data to be printed (i.e., application data) to the format specific to a printer. The purpose of printer drivers is to allow applications to perform printing without being aware of the technical details of each printer model.

For example, a user of a client 106 may select an application hosted on the server 102 for printing. Accordingly, a print command is issued by the client 106 to the application running at the server 102. In an implementation, the generic printer driver 108 is configured to emulate properties of a client printer driver 110 installed at the client 106-1. Upon receipt of a print command from the client 106-1, the generic printer driver 108 performs configuring and print rendering associated with the print command. The configuring includes obtaining printer settings that include printing preferences and capabilities, and document properties associated with the printer 112-1 and the application data. Printer settings may further include, for example, selection of printer tray, printing on both sides of sheet, economy printing, pages per sheet, selection of landscape and portrait orientations for the page, selection of page size, etc.

A printer spooler associated with the generic printer driver 108 calls for a printer user interface (UI) to get or set the printer settings. The generic printer driver 108 directs the call to the client 106-1 to obtain the printer settings from a client printer driver 110. The client printer driver 110 displays a printer UI to a user at the client 106-1. The user utilizes the printer UI to select printer settings associated with the printer and the application data. The client 106-1 sends the selected printer settings back to the server 102. It is be noted that the printer settings have been obtained from a printer UI presented by the client printer driver 110 and hence the printer settings are applicable to the local printer 112-1 connected to the client 106-1.

In this example, the server 102 receives the printer settings from the client 106-1. The generic print driver 108 at the server 102 converts the printer settings and the application data into an XML Paper Specification (XPS) document. It is noted that the extensible markup language (XML) Paper Specification (XPS) is a document storage and viewing specification that describes formats and rules for distributing, archiving, rendering, and processing XPS documents. Subsequently, the XPS document is redirected to the client 106 which converts the XPS document to a "language" recognizable by the client printer driver 110. The client printer driver 110 directs a local printer 112 connected to the client 106, to print the application based on the received printer settings.

The client printer driver 110 intercepts the call for the printer settings and in response, provides for a default set of printer settings applicable to the printer 112-1. The default printer settings are received by the server 102 and are utilized by the generic printer driver 108 for rendering the XPS document. It may be appreciated that the above description is equally applicable to other clients 106 interacting with the server 102. Accordingly, a client printer driver 110 may be installed in each of the clients 106 to support the printers 112 connected to them. Examples of a printer include laser printers, bubblejet printers, inkjet printers, multi-purpose machines which combine printing, faxing and/or photocopying capabilities, and the like. In an implementation, the printers 112-1, 112-2, . . . , 112-N, may be from different manufacturers and hence correspond to different printer drivers on respective clients 106-1, 106-2, . . . , 106-N. In such an implementation, the generic printer driver 108 may be configured to emulate the exact properties of each of the client printer drivers 110 as described above.

Exemplary Server Computing Device

Figure 2:
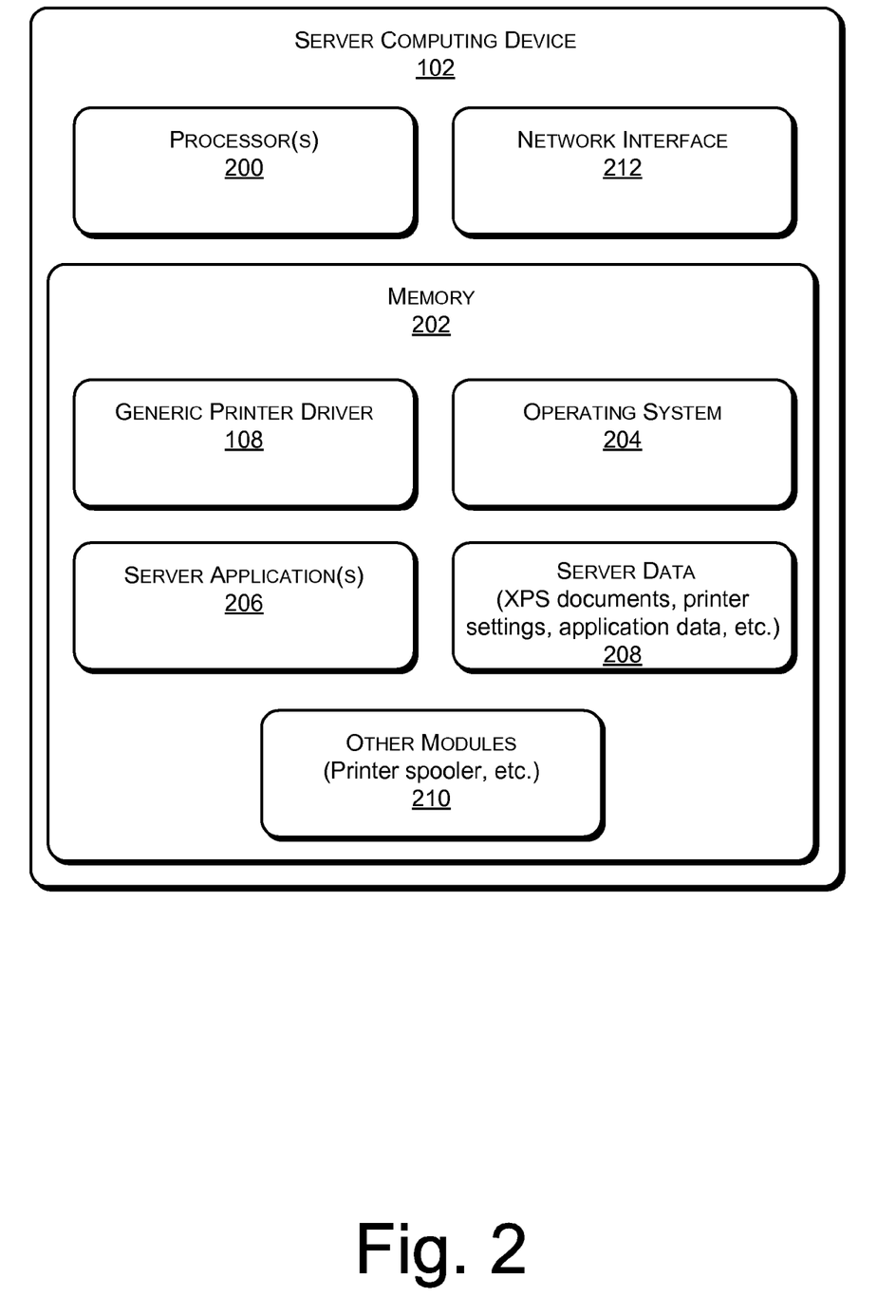
FIG. 2 is an implementation of an exemplary server computing device for printer redirection.

FIG. 2 shows an exemplary implementation of server 102 for printer redirection. The server 102 includes one or more processor(s) 200 coupled to a memory 202. Such processor(s) 200 could be for example, microprocessors, microcomputers, microcontrollers, digital signal processors, central processing units, state machines, logic circuitries, and/or any devices that manipulate data based on operational instructions. The processor(s) 200 are configured to fetch and execute computer-program instructions stored in the memory 202. Memory 202 includes computer-readable media in the form of volatile memory, such as Random Access Memory (RAM) and/or non-volatile memory, such as Read Only Memory (ROM) or flash RAM or a combination thereof.

The memory 202 may include an operating system 204 that provides a platform for execution of one or more applications on the server 102. The memory 202 may also include one or more server applications 206 that include, for example, word processors, spreadsheets, web browsers, etc. The server application 206 may be executed upon receiving a request from one or more clients 106. In typical server-client architecture, the server 102 may function as an application server where the clients 106 rely on applications, which execute on the server 102 for all or certain application programs that provide functionality, and particularly access and control of one or more server applications 206. Execution of the server applications 206 implies one or more client-server sessions between the server 102 and clients 106. The server 102 implements a generic printer driver 108 to redirect printers for printing a server application 206 independent of the type of printer associated with the printing.

As discussed above, a client 106 provides a print command to print application data corresponding to a server application 206. Upon receiving the print command, the server application 206 calls the generic printer driver 108 to obtain printer settings associated with the print command. The printer settings may be set by a user by means of a printer user interface (UI) presented by a printer driver associated with a printer. Accordingly, the server application 206 invokes the generic printer driver 108 to present a printer UI. The printer UI provides a user with an interface for setting printing preferences and document properties (printer settings). In an exemplary implementation, the generic printer driver 108 is configured to redirect the call for the printer user UI to the client 106.

In the above example, when a client 106 intercepts the call and provides a printer UI to the user at the client 106. The user utilizes the printer UI displayed at the client 106 to select, set, modify, or change the printer settings. The client 106 obtains the printer settings from the user and sends it back to the server 102. The printer settings so received is stored in the server data 208.

The generic printer driver 108 may utilize the printer settings to render the application data for printing. Subsequently, the data associated with the server application (i.e., application data) and the printer settings are converted into an XML Paper Specification (XPS) document by the generic printer driver 108. The resulting XPS document may be stored in the server data 208. The XPS document is redirected by the generic printer driver 108 to the client 106-1 for printing.

The client 106 implements one or more plug-ins to interpret the XPS document and extract the contents therein (i.e., application data and printer settings). In addition, the extracted contents may be forwarded to the client printer driver 110 for rendering of the application data. It is noted that such a rendering is pertinent to a printer 112 connected to the client 106. Subsequently, the client printer driver 110 directs the printer 112 to print the application data according to the received printer settings.

The memory 202 may further include other module(s) 210 which, for example, may implement modules for providing the client-server interface. The other module(s) 210 may also implement a session manager (not shown) configured to manage one or more client-server sessions in the system 100 as shown in FIG. 1. The other module(s) 210 may also implement a printer spooler associated with the generic printer driver 108. For example, the server application 206 notifies the printer spooler about the print command issued by the client 106. The printer spooler calls the generic printer driver 108 to provide for the printer settings associated with the printer 112 connected to the client 106. The generic printer driver 108 forwards the call to the client 106-1 to acquire the printer settings. The client 106-1 returns the printer settings in a manner as discussed above. Thus, the generic printer driver 108 emulates the exact properties of the client print driver 110 and this emulation is transparent to the printer spooler implemented in other module(s) 210. The server 102 may further include a network interface 212 to enable communication with the one or more clients 106 through the network 104.

Exemplary Generic Printer Driver

Figure 3:
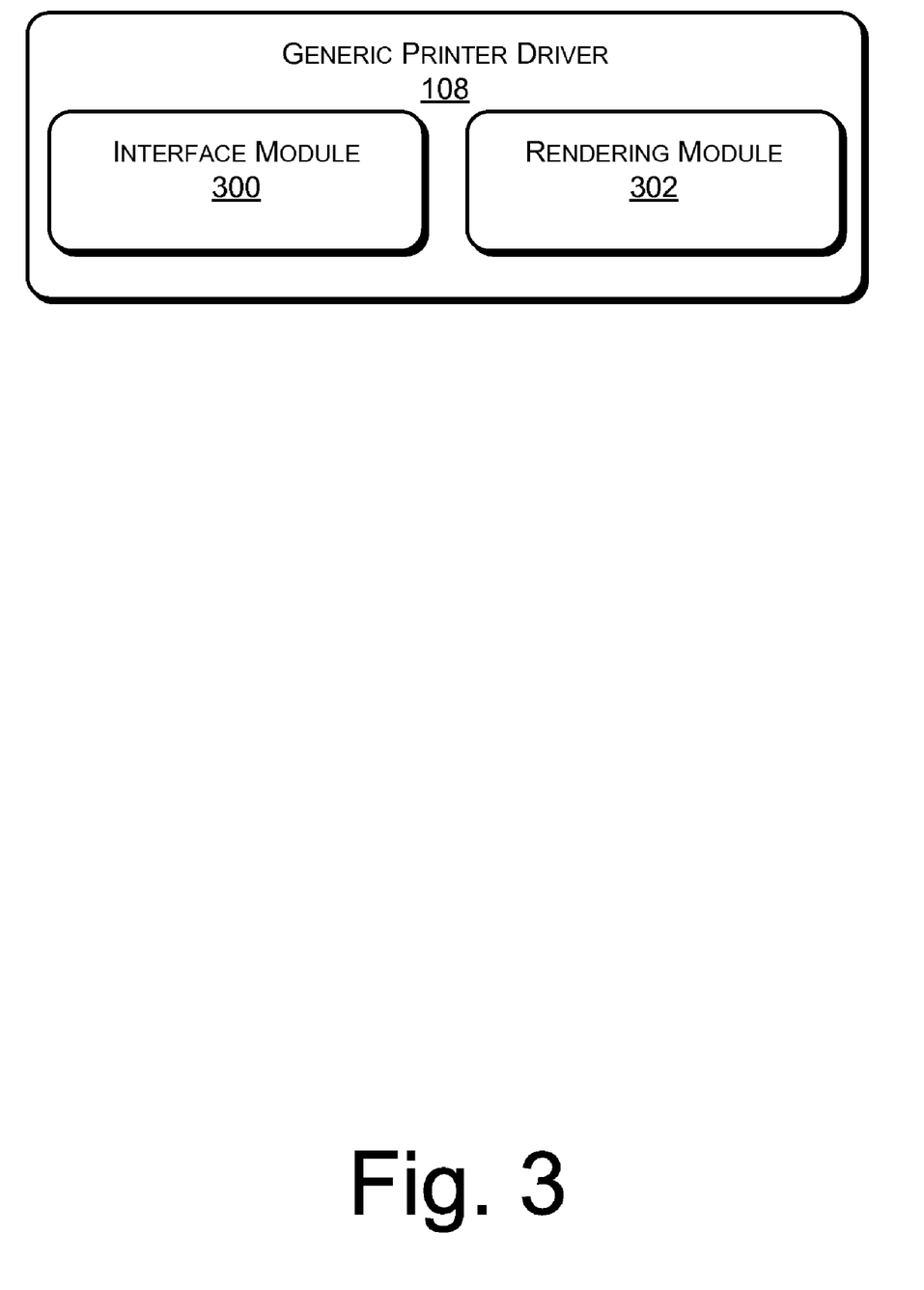
FIG. 3 is an illustration of an exemplary generic printer driver according to an embodiment.

FIG. 3 shows an implementation of an exemplary generic printer driver 108 for printer redirection. Accordingly, the generic printer driver 108 includes an interface module 300 and rendering module 302. The generic printer driver 108 emulates the exact properties of the printer driver 110 installed in a client 106. Such properties may include, but are not limited to, printing preferences, document settings, printer user interface (UI), configuration of printers, and graphical rendering, etc. For redirecting printer 112 associated with the client 106, a print queue may be created that corresponds to the printer 112. The print queue is created and managed by the printer spooler (i.e., other modules 210) and stored in the server data 208. In one of the implementations, the print queue may include a plurality of print jobs corresponding to print commands from the clients 106. Each of the print jobs may come from the same or different clients 106, and the generic printer driver 108 may be configured to emulate properties of the client printer drivers 110 associated with each of the print jobs.

By way of example, when a client 106 issues a print command, the printer spooler (other modules 210) at the server 102 calls the generic printer driver 108 for the printer settings. Whenever the printer spooler wants to know or modify printer setting or show a printer UI, the printer spooler calls the interface module 300. The interface module 300 redirects the call to the client 106 to get actual printer settings. In an alternative embodiment, such a call may correspond to a request for presenting a printer UI at the client 106.

Accordingly, the interface module 300 redirects the call for the printer settings to the client 106, which issued the print command. The client 106 may implement one or more plug-ins in the operating system 404 to interpret such calls. The call may include a query for a set of default printer settings. Such a set of default printer settings may be previously stored in the server data 208 and may be utilized when the client 106 issues a print command. Alternatively, the client printer driver 110 presents a printer UI to a user at the client 106 to change the default printer settings. The user may also utilize the printer UI displayed at the client 106 to select, set, modify, or change the printer settings. The client 106 obtains the printer settings from the user and sends it back to the interface module 300. The interface module 300 stores the printer settings in the server data 208.

The printer spooler at the server 102 obtains from the application, the application data to be printed. Accordingly, the application data is presented to the generic printer driver 108 for rendering. In another embodiment, the rendering module 302 converts the application data and the associated printer settings (in server data 208) into XPS format file (i.e., an XPS document). The XPS document is stored in the server data 208. The XPS document may include the document properties and the printing preferences along with the application data to be printed. The XPS file format facilitates the generic printer driver 108 to render application data and printer settings independent of the client printer driver 110. The generic printer driver 108 retrieves the XPS document and sends it to the client 106 for printing.

In an exemplary embodiment, the client 106 receives the XPS document and presents it to the client printer driver 110. The client 106 implements a conversion module to convert the XPS document back to a data format acceptable to the client printer driver 110. The client printer driver 110 proceeds with the printing of the application data based on the printer settings. Accordingly, a printer 112 prints the application data as provided by the client printer driver 110.

Exemplary Client Computing Device

Figure 4:
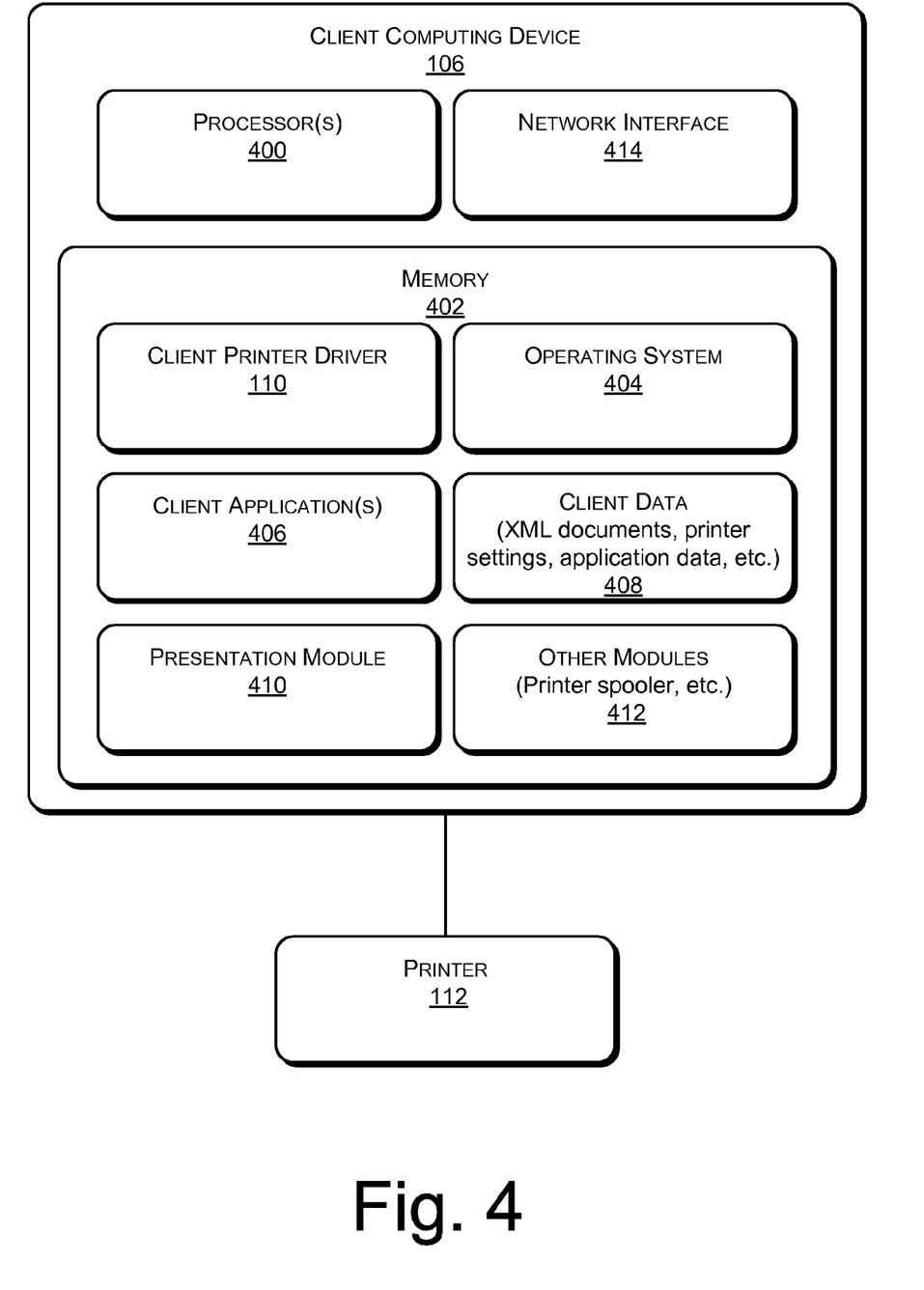
FIG. 4 illustrates an exemplary embodiment of a client computing device for printer redirection.

FIG. 4 shows an implementation of an exemplary client computing device 106 for printer redirection. Accordingly, the client 106 includes one or more processor(s) 400 coupled to a memory 402. Such processor(s) 400 could be for example, microprocessors, microcomputers, microcontrollers, digital signal processors, central processing units, state machines, logic circuitries, and/or any devices that manipulate data based on operational instructions. The processor(s) 400 are configured to fetch and execute computer-program instructions stored in the memory 402. Memory 402 includes computer-readable media in the form of volatile memory, such as Random Access Memory (RAM) and/or non-volatile memory, such as Read Only Memory (ROM) or flash RAM or a combination thereof. The memory 402 may include an operating system 404 that provides a platform for execution of one or more client application(s) 406 on the client 106. Such client applications 406 may include, for example, word processors, spreadsheets, web browsers, etc.

In an exemplary scenario, a client 106 executes one or more of the server application(s) 206 hosted on the server 102. Such execution is facilitated by a client-server session which may be created when the client 106 accesses the server application 206. Of the many features extended by the client-server session, printing functionality may be an important feature as far as the server application 206 is concerned. In an exemplary implementation, the memory 402 includes the client printer driver 110 that supports the printer 112 connected to the client 106.

By way of example, a print command may be issued by the client 106 to application data associated with the server application 206. Upon receiving the print command, the server application 206 invokes the generic printer driver 108 to present a printer user interface (UI). The generic printer driver 108 is configured to redirect the call for the printer user UI to the client 106.

Accordingly, the client 106 intercepts the call and provides a printer UI to the user at the client 106. In an implementation, the operating system 404 is configured to intercept such calls from the server 102. Alternatively, a plug-in may be included in the operating system 404 to suitably intercept the call for printer UI. The call intercepted by the client 106 invokes the client printer driver 110 to present a printer UI to the user. Such a printer UI is specific to a printer driver and an operating system. It may be appreciated that each of the printer UIs presented by the printer drivers installed at clients 106 is a unique feature of the respective printer driver. For example, printer 112 connected to the client 106 has a unique client printer driver 110. Accordingly, the printer UI presented by the client printer driver 110 is unique to the printer 112 and the client printer driver 110.

Subsequently, the user may utilize the printer UI displayed at the client 106 to select, set, modify, or change the printer settings. The client 106 obtains printer settings from the user and sends it back to the server application 206 executing at server 102. The printer settings received by the server application 206 may be stored in the server data 208. The generic printer driver 108 may utilize the printer settings to provide printing preferences and document properties associated with the application to be printed.

In particular, the generic printer driver 108 may utilize the printer settings to render the server application 206 to be printed. As discussed above, while a print command is being processed, the application data may be transformed to a format that a printer can recognize, interpret, and print out. In an exemplary implementation, the generic printer driver 108 prints the server application 206 and the related printer settings into an XPS document which is directed to the client 106 for printing.

The client 106 may implement a presentation module 410 to receive the XPS document corresponding to the issued print command. The presentation module 410 extracts the application data and the printer settings from the XPS document and stores them in the client data 408. Although the presentation module 410 has been shown as a separate module, it may be appreciated that the presentation module 410 may be implemented within the operating system 404. The client printer driver 110 retrieves and converts the application data and printer settings to a language recognizable by the printer 112. The printer 112 prints the application data based on the printer settings.

The memory 402 further includes other module(s) 210 that implement a printer spooler associated with the client printer driver 110. The client 106 may also include a network interface 414 to enable communication with the server 102 through the network 104.

Exemplary Method

Exemplary method for printer redirection is described with reference to FIGS. 1 to 5. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
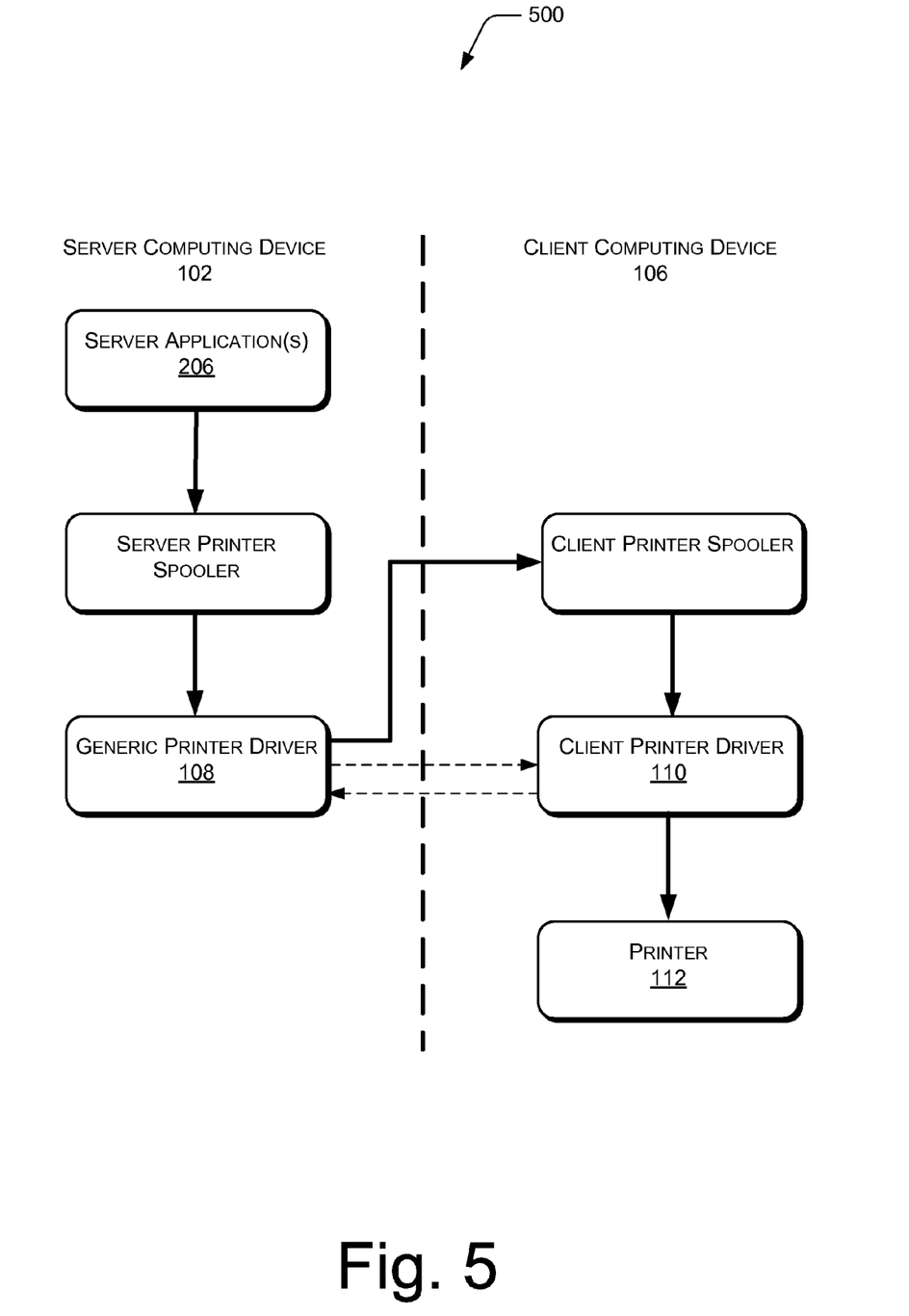
FIG. 5 illustrates exemplary interactions between a client computing device and a server computing device to implement printer redirection.
Figure 6:
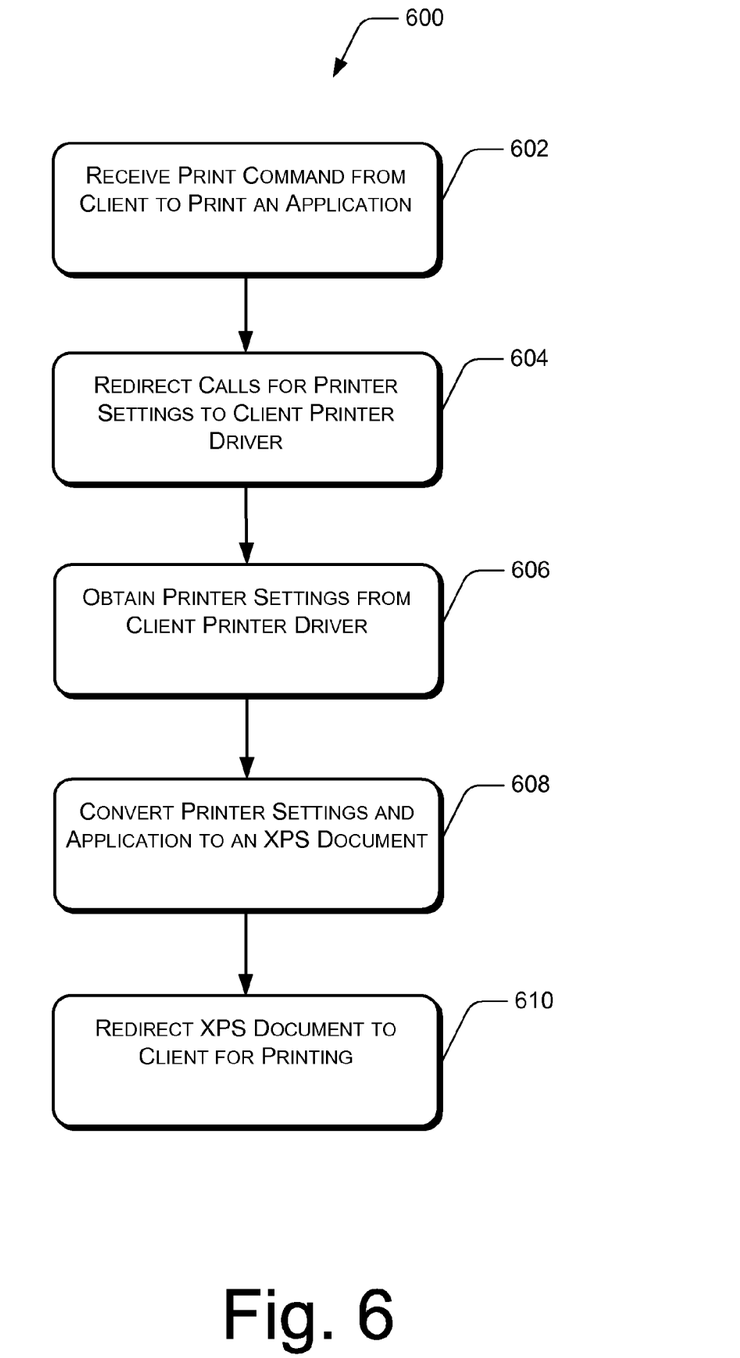
FIG. 6 illustrates an exemplary method for printer redirection in a client-server computing environment.

FIG. 5 illustrates an exemplary block diagram depicting the interaction between the server computing device or server 102 and client computing device or client 106 to implement printer redirection. FIG. 6 shows an exemplary method 600 for printer redirection. For purposes of exemplary illustration, the method 600 is described with reference to blocks of FIG. 5. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 602, a print command is received from a client 106, at the server 102 to print an application hosted on the server 102. In an exemplary implementation, the client 106 access the server application 206 and issues a print command to print data associated with the server application 206.

At block 604, calls for printer settings from server printer spooler is redirected to the client printer driver 110. In one of the embodiments, a server printer spooler (other modules 210) at the server 102 queries the generic printer driver 108 for printer settings associated with the server application 206 and the printer 112. The generic printer driver 108 is configured to redirect such a query or call to the client printer driver 110. This is illustrated by a dotted arrow from the generic printer driver 108 to client printer driver 110 as shown in FIG. 5. The client printer driver 110 supports a printer 112 connected to the client 106 and correspondingly provides printer settings for the printer 112. In an alternative embodiment, the generic printer driver 108 may receive a call for presenting a printer user interface (UI) to a user to set the printer settings. Accordingly, the generic printer driver 108 may redirect the call to the client printer driver 110 as a result of which a printer UI is displayed to the user at the client 106.

At block 606, printer settings are obtained from the client printer driver. In one of the configurations, the user selects or modifies the printer settings by means of the printer UI presented by the client printer driver 110 at block 604. The client 106 obtains the printer settings from the printer UI and sends it to the server 106. In particular, the generic printer driver 108 receives the printer settings from the client 106 and saves it in the server media data 208. This is illustrated by a dotted arrow from the client printer driver 110 to the generic printer driver 108 as shown in FIG. 5. In an alternative embodiment, the generic printer driver 108 may also receive a default set of printer settings from the client driver 110.

At block 608, the printer settings obtained at block 606 and the application to be printed are converted to an XPS document. In an exemplary configuration, the generic printer driver 108 renders the printer settings and the server application 206 to an XPS document. Such rendering involves conversion of the file format of the server application to an XPS file format. It may be noted that the XPS document can include both the application data to be printed and the corresponding printer settings.

At block 610, the XPS document generated at block 608 is redirected to the client for printing. Accordingly, the generic printer driver 108 sends the rendered XPS document to the client 106. This is illustrated by a solid arrow from the generic printer driver 108 to the client printer spooler. In particular, the XPS document is received by a presentation module 410 implemented in the client 106-1, which extracts the application data and the printer settings from the XPS document. The extracted application data and printer settings are utilized by the client printer spooler (i.e., other modules 412). Subsequently, the client printer driver 110 directs the printer 112 to print the application data based on the received printer settings.

CONCLUSION

The above-described methods and computer describe printer redirection. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
executing an application on a first computing device having one or more processors, the application accessed by a second computing device to produce application data;
receiving an instruction from the second computing device to print the application data associated with the application executing on the first computing device, on a printer in communication with the second computing device;
querying a generic printer driver at the first computing device for printer settings for printing the application data associated with the application executing on the first computing device;
redirecting the querying to a printer driver at the second computing device;
receiving, by the first computing device, printer settings associated with the printer in communication with the second computing device; and
converting, by the generic printer driver at the first computing device, the printer settings to an extensible markup language paper specification (XPS) document that includes the application data.

2. The method of claim 1, wherein the querying is initiated in response to a print command received by the application, the print command sent from the second computing device to the application executing on the first computing device.

3. The method of claim 1, wherein the printer settings are received by the first computing device through a user interface presented at the second computing device.

4. The method of claim 1, further comprising sending the document to the second computing device for printing at the printer that is in communication with the second computing device.

5. The method of claim 4, wherein the second computing device extracts the printer settings and the application data from the XPS document for printing at the printer that is in communication with the second computing device.

6. The method of claim 1, the converting the printer settings to the XPS document further comprising transforming the application data to a format recognizable by the printer.

7. A server comprising:
a memory;
one or more processors operatively coupled to the memory; and
an operating system in the memory providing a platform for executing one or more applications on the server, wherein, in response to receiving a print command from a client device that is accessing an application of the one or more applications executing on the server to print application data associated with the application, a generic printer driver executing at the server is called to obtain printer settings associated with the print command, redirection is performed to a client printer driver at the client device to obtain the printer settings of a printer that is coupled to the client device, wherein the printer settings are received by the server from the client device, and used to render the application data into an extensible markup language paper specification (XPS) document to be sent to the client device for printing at the client device.

8. The server of claim 7, wherein the generic printer driver includes an interface module and a rendering module.

9. The server of claim 7, further comprising an interface module for receiving the printer settings from the client through a user interface at the client that enables a user to select preferences for the printer settings.

10. The server of claim 7, further comprising a client-server module for establishing a client-server session in response to the client requesting access to the application executing on the server.

11. The server of claim 7, further comprising a session manager module to manage multiple client-server sessions with multiple clients, each of the multiple clients having different printer drivers.

12. The server of claim 7, further comprising a print spooler associated with the generic print driver.

13. A client device comprising:
a memory;
one or more processors operatively coupled to the memory; and
a client printer driver in the memory to support a printer connected to the client device,
the client printer driver providing printer settings associated with the printer to a server when a print command is provided by the client device to be received by an application resident on the server, wherein:
the printer settings include at least one of:
printing preferences, or
document properties; and the client printer driver sends the printer settings to the server in response to a call received from a generic printer driver on the server and the client printer driver receives an extensible markup language paper specification (XPS) document from the server for printing at the client device.

14. The client device of claim 13, wherein the call is received as a result of the print command provided by the client device for receipt by the application resident on the server.

15. The client device of claim 13, wherein the XPS document includes the printer settings and application data.

16. The client device of claim 15, further comprising a presentation module to receive the XPS document and extract the application data and the printer settings from the XPS document.

17. The client device of claim 13, further comprising a printer spooler associated with the client printer driver.

18. The client device of claim 13, further comprising a network interface for the client to communicate with the server.

* * * * *